United States Patent [19]
Miller et al.

[11] Patent Number: 5,898,994
[45] Date of Patent: May 4, 1999

[54] METHOD FOR REPAIRING A NICKEL BASE SUPERALLOY ARTICLE

[75] Inventors: Merrill A. Miller, Pleasant Plain; Jeffrey J. Reverman, Cincinnati; Lyle T. Rasch, Fairfield, all of Ohio

[73] Assignee: General Electric Company, Cincinnati, Ohio

[21] Appl. No.: 08/664,763

[22] Filed: Jun. 17, 1996

[51] Int. Cl.$^6$ .................................................. B22D 19/10
[52] U.S. Cl. .................. 29/889.1; 29/402.01; 29/402.18; 228/119; 148/675; 148/712; 134/2
[58] Field of Search .............................. 29/402.01, 889.1, 29/402.18, 402.19, 402.21; 228/119; 148/675, 712; 75/628; 134/2

[56] References Cited

U.S. PATENT DOCUMENTS

| | | | |
|---|---|---|---|
| 2,380,202 | 7/1945 | Stroup | 148/21.3 |
| 2,679,466 | 5/1954 | Spendelow, Jr. et al. | 148/13.1 |
| 3,287,181 | 11/1966 | Steverding | 148/20.3 |
| 3,490,958 | 1/1970 | Robinson, Jr. | 148/13.1 |
| 4,098,450 | 7/1978 | Keller et al. | 228/119 |
| 4,188,237 | 2/1980 | Chasteen | 134/2 |
| 4,249,963 | 2/1981 | Young | 148/16 |
| 4,285,459 | 8/1981 | Baladjanian et al. | 228/119 |
| 4,324,594 | 4/1982 | Chasteen | 134/2 |
| 4,381,994 | 5/1983 | Smith, Jr. et al. | 228/119 |
| 4,405,379 | 9/1983 | Chasteen | 134/2 |
| 4,434,348 | 2/1984 | Reid | 219/61 |
| 4,842,183 | 6/1989 | Antony et al. | 228/119 |
| 5,016,810 | 5/1991 | Sikka | 228/206 |
| 5,319,179 | 6/1994 | Joecks et al. | 219/137 R |
| 5,346,563 | 9/1994 | Allen et al. | 148/675 |
| 5,366,563 | 11/1994 | McKenzie | 148/216 |
| 5,373,986 | 12/1994 | Rafferty et al. | 228/206 |
| 5,728,227 | 3/1998 | Reverman | 134/2 |

OTHER PUBLICATIONS

Metals Handbook Ninth Edition—vol. 6, Welding, Brazing, and Soldering cover sheet, pp. 368 & 369.

"The HF 'Flouride–Ion' Cleaning Technique for Superalloys", by Louis F. Pochet, Director, Coating Process Technology; Alfred L. Clavel, Vice President, Engineering; Ti–Coating, Inc., Mt. Clemens, MI 48045, pp. 1–6.

*Primary Examiner*—David P. Bryant
*Attorney, Agent, or Firm*—Andrew C. Hess; David L. Narciso

[57] ABSTRACT

A method for repairing an environmental protective coated article portion of a gas turbine engine article made of a Ni base superalloy including Cr and at least about 6 wt. % total of Al and Ti comprises removing the coating, exposing the article portion to a reducing mixture of gases including, by weight, greater than 6% up to about 20% hydrohalogen gas with the balance principally hydrogen gas, and preferably about 10–15 wt. % hydrogen fluoride gas. Exposure is at a temperature in the range of about 1600°–2000° F. for a time, greater than about 2 hours, and preferably about 2–10 hours, sufficient to remove from within the article portion metal sulfides, Al, Ti, oxides of Al or Ti, or their combinations. Then the article portion is recoated. One form relates to weld repairing the article portion by removing Al or Ti or both to a depth up to about 0.003". Another form removes metal sulfides, resulting from or relating to combustion, from within the body of the article portion to a depth up to about 0.005".

7 Claims, No Drawings

METHOD FOR REPAIRING A NICKEL BASE SUPERALLOY ARTICLE

FIELD OF THE INVENTION

This invention relates to the repair of Ni base superalloy articles, for example of the type used in the hot section of gas turbine engines; and, more particularly, to such articles which have a surface wall, a projection or other outer portion which has been damaged during engine operation.

BACKGROUND OF THE INVENTION

Most modern high temperature Ni base superalloy articles used in gas turbine engines, particularly those which are air cooled and have relatively complex inner cooling chambers and passages, are difficult and expensive to manufacture. Therefore, when such an article is damaged during engine operation, it is far more desirable to repair rather than replace the article. As a result, a variety of repair methods have been developed and reported.

Some reported methods use a form of fluoride ions to remove contaminants disposed on a surface in preparation for subsequent repair. For example, in preparation for the brazing type repair of a crack or crevice in an article surface, Keller et al in U.S. Pat. No. 4,098,450 (patented Jul. 4, 1978), remove oxides of Al and/or Ti by exposing the surface of such damaged portion to fluoride ions. Then a repair alloy is flowed into the cleaned portion. Modification of such use of fluoride ions is reported in U.S. Pat. Nos. 4,188,237 and 4,405,379 —Chasteen (patented Feb. 12, 1980 and Sep. 20, 1983, respectively), wherein it is intended to render article surfaces more brazable by cleaning through use of an organic resin as a fluoride ion source. Gases including fluorides have been used to decarburize surfaces as well as to act as a "getter" atmosphere for oxygen to attempt to avoid oxidation in some types of heat treatments.

All of such reported preparations of a surface for brazing do not address the problems associated with preparing a damaged portion beneath a surface of an article for welding in which a damaged portion, for example a crack, crevice, worn or abraded surface, or entire wall portion, is too extensive for brazing. In such an instance, a significant amount of repair alloy must be added by welding; and weld integrity, including weldabilty and adhesion, becomes a significant problem with engine-run Ni base superalloy articles, particularly in the repair of relatively thin outer walls of articles. The more highly alloyed advanced Ni base superalloys of the type manufactured as substantially single crystals or as directionally solidified elongated multigrain articles are particularly difficult to repair weld successfully. When the repair weld is at bands, projections such as platforms, and thin outer wall portions at which complex shapes exist, such as at the tips and leading and trailing edges of blades, the problem of repair welding becomes still more difficult.

SUMMARY OF THE INVENTION

The present invention, in one form, provides a method for repairing an article portion, for example an airfoil, outer wall, band, projection such as a platform, lip, etc., of a gas turbine engine article which has experienced high temperature operation in the engine, the article being made of a Ni base alloy superalloy including Cr and at least about 6 wt. % total of Al and Ti. The article includes a high temperature environmental resistant coating on an outer surface. The method includes removing the coating at least from the article portion to be repaired, and subsequently exposing at least the article portion to a reducing mixture of gases including, by weight, greater than 6% up to about 20% hydrohalogen gas, with the balance principally hydrogen gas. Exposure is at a temperature in the range of about 1600°–2000° F. for a time, greater than about 2 hours, preferably 2–10 hours, and sufficient to remove, from within the article portion, materials selected from sulfides as well as the elements Al and Ti and their oxides.

In one specific form, such method is for weld repairing an article portion in the form of a relatively thin outer wall of the air cooled article, the wall having a thickness in the range of about 0.02" to about 0.08". In another form, the method is for the weld repair of a substantially solid member, such as an engine band member or an article projection such as a platform, lip, etc., sometimes associated with blades, vanes, disks, drums, etc. The time of exposure is sufficient to substantially reduce Al and Ti content from within the article portion, for example to a depth of up to about 0.003", providing a Ni layer which is Cr-rich in the article portion to prepare such portion for weld repair. These steps enable a successful weld repair to be conducted while the article workpiece is at room temperature rather than at the elevated temperatures, for example in the range of about 1500°–1800° F., previously required and commonly used for such repair.

In another more specific form, the method of the present invention removes from within the body of the outer surface of an article hot corrosion products, typically sulfides generated during engine operation and not merely impurities in the alloy itself, by exposing the outer surface to the reducing mixture of gases for greater than about 2 hours and for a time sufficient to reduce such products to a depth up to about 0.005".

DESCRIPTION OF THE PREFERRED EMBODIMENTS

Brazing sometimes can be use to repair relatively narrow cracks, crevices and eroded areas. However, damaged portions with missing material greater than about 0.02" generally are too wide for repair by brazing and must be filled by welding with a compatible filler material. In one example, such missing material generally can be found on the trailing edge, matefaces, and/or leading edge of airfoil shaped members. One commonly used welding method is known in the art as gas tungsten arc welding (GTAW). For repair of superalloy articles, GTAW generally uses a superalloy filler material which is compatible with the alloy from which the article was made, and conveniently is the same or substantially the same superalloy. However, known repair welding has required pre-heating of the article to be welded to an elevated temperature, for example in the range of about 1500°–1800° F., to prepare the surface so that the weld will adhere to or bond with the weld repaired portion. The method of the present invention prepares the surface to be repaired so that it can be welded at room temperature without such pre-heating.

In respect to the form of the method of the present invention relating to removal of products of hot corrosion, such as metal sulfides, it was recognized that certain known surface cleaning methods using fluoride ions produced excessive intergranular attack within a cast Ni base superalloy when used to reduce metal sulfides from within the body of an article. Use of the reducing mixture of gases of the present method enables metal sulfide reduction without such intergranular attack of the base metal.

As was stated above, forms of the present invention relate to the repair of an article portion, such as an outer wall portion or other portion of a gas turbine engine article, for example a substantially solid article projection or band member. Generally, such repairs relate to a surface area greater than about 0.02" and include not only cracks and crevices but also worn, eroded, and abraded areas as well as relatively large holes completely through wall portions at which material is completely missing. Also, to contrast the present invention with known surface cleaning methods generally to remove surface oxides, sulfides, carbides, impurities, etc., the present invention characterizes reduction of the described products to be from within the body of the article, for example within the wall portion not just on the outer surface. In the form of the invention relating to weld repair, such elements as Al and Ti are reduced from their elemental forms as gamma prime formers from the body of the article, not just as their oxide forms, to prepare the portion for welding, whether at an outer surface or from cracks, crevices, etc., by providing a Cr-rich Ni layer. In the form relating to metal sulfide removal, the sulfides as products of or related to combustion are reduced within the body of the article, generally leaving a void in which the metal sulfide previously resided. One form of the present invention treats at least surface or near surface voids by applying a powdered repair alloy which is heated to diffuse the repair alloy into the article portion in which the voids were created by the removal of the metal sulfides.

Although Al and Ti are important gamma prime strengthening elements in Ni base superalloys, it has been recognized that their presence in a surface portion can be detrimental to the integrity, such as weldability and adherence, of repair welds. During evaluation of the present invention, it was recognized that if a surface portion to be welded could be substantially depleted of Al and Ti, leaving a Cr-rich Ni layer at the weld area, repair welding such as GTAW could be used at room temperature, without elevated temperature preheating of the workpiece portion to be welded. This provided a significantly better and more simple repair method which is less expensive than known repair methods. In addition, repair of relatively thin walls in the range of about 0.02–0.08" was enhanced through better welds and at room temperature, avoiding any distortion problems which might be associated with preheating relatively thin structures to elevated temperatures in preparation for welding.

In one specific example, a gas turbine engine air cooled high pressure turbine nozzle article was inspected after high temperature engine operation. The nozzle was a directionally solidified cast structure with an air cooled interior connected to the nozzle surface through air cooling passages exiting at cooling openings. The article was made of a Ni base superalloy called Rene' 142 alloy consisting essentially nominally by weight of about: 12% Co, 6.1% Al, 6.8% Cr, 6.4% Ta, 5% W, 1.5% Mo, 2.8% Re, 1.5% Hf, 0.12% C, 0.015% B, with the balance Ni and incidental impurities. In this alloy, the gamma prime former Al was included at about 6.1%. It included an outer wall portion of a thickness in the range of about 0.05 –0.08" and was coated with an aluminide coating commercially available as Codep aluminide coating, generally described in U.S. Pat. No. 3,667,985— Levine et al., patented Jun. 6, 1972. The nozzle was inspected after having been operated in an engine and found to have outer wall portion damage including burns, erosion, and missing material greater than 0.02" wide or deep. After inspection, the entire article was stripped of the aluminide coating, first by grit blasting then by contacting the article with a commercial acid stripping liquid including, by weight, about 50% nitric acid and 50% phosphoric acid, at a temperature of about 170° F. for about 2 hours. Then the article was exposed to a reducing mixture of gases within the range of the present invention, preferably including hydrogen fluoride gas in the range of about 10–15 wt %. In this example the gas mixture consisted essentially, by weight, of about 13% hydrogen fluoride gas and about 87% hydrogen gas. The article was exposed for about four hours at about 1900° F., a time sufficient to deplete substantially the gamma prime formers, primarily Al in the Rene' 142 alloy, from within the outer wall surface portion to a depth of about 0.003" to provide a more Cr-rich Ni layer more suitable for subsequent weld integrity. Then the damaged outer wall portion was welded using GTAW at room temperature, without preheating, using a weld wire of substantially the same Rene' 142 alloy composition. Resulting from this method was a weld repaired wall portion including a tightly adherent weld. After welding and inspection, the repaired outer wall portion was recoated with Codep aluminide coating.

The above example was repeated with a similar nozzle made of a Ni base superalloy called Rene' N4 and consisting essentially nominally by weight of about: 7.5% Co, 4.2% Al, 9.8% Cr, 3.5% Ti, 4.8% Ta, 6% W, 1.5% Mo, 0.5% Nb, 0.15% Hf, 0.06% C, 0.004% B, with the balance Ni and incidental impurities. In this alloy, the gamma prime formers Al and Ti were included at a total of about 7.7%. The nozzle was repaired as above with the same good results.

One form of the method of the present invention includes removing subsurface products of hot corrosion such as metal sulfides prior to repair of superalloy article of the type described above. Such subsurface compounds, if left in place, can lead to premature deterioration of the article, particularly a relatively thin article wall. In one example, an air cooled high pressure turbine nozzle of the type and of the Rene' 142 superalloy described in the above first example was inspected after high temperature operation in an engine. It was found to include hot corrosion metal sulfide products within the body of the outer wall portion. The entire outer wall surface was stripped of the Codep aluminide coating using the above described grit blasting then the commercial chemical acid strip commonly used for such purposes. Then the uncoated outer wall surface was exposed to the above described reducing mixture of gases for about 4 hours at about 1900° F. Subsequent evaluation of this form of the present method showed that such an exposure time was sufficient to reduce and remove the metal sulfides to a depth of up to about 0.005", leaving voids in their places. In this example, voids were repaired by applying to the surface a powdered repair alloy in the form of a mixture of alloy powders, sometimes called PACH alloy and more fully described in U.S. Pat. No. 4,830,934—Ferrigno et al., patented May 16, 1989, the disclosure of which is hereby incorporated herein by reference. The PACH alloy powder mixture was applied to the surface and heated to a temperature in the range of about 2200°–2250° F. to flow and diffuse the alloy mixture into the surface and subsurface voids. Thereafter, the outer surface was recoated with the above described Codep aluminide coating.

During evaluation of the present invention, it was recognized that greater than about 6 wt % of the hydrohalogen gas, such as hydrogen fluoride gas, is needed in the reducing gas mixture because less than that amount was insufficient to reduce and remove the amount of the gamma prime formers Al or Ti or both in a practical time. Also, it was recognized that greater than about 20 wt. % of such gas resulted in excessive intergranular attack and alloy depletion in the temperature range of about 1600°–2000° F. for exposure times greater than about 10 hours. Times in the range of about 2–10 hours are preferred for the method of the present invention, and more specifically about 2–6 hours.

The present method enables improved repair of such articles as are described above by enhancing weld integrity through removal, from within the body of a portion to be repaired, of gamma prime strengthening elements such as Al and Ti to provide a Ni layer more Cr-rich. In addition, it enables reduction and removal of products of hot corrosion, such as metal sulfides, from within the body of the structure to avoid subsequent structural deterioration. The present invention has been described in connection with various specific examples, embodiments and combinations. However, it will be understood by those skilled in the arts involved that this invention is capable of a variety of modifications, variations and amplifications without departing from its scope as defined in the appended claims.

We claim:

1. In a method for repairing an article portion of a gas turbine engine article which has experienced high temperature operation in an engine, the article being made of a Ni base superalloy including Cr and at least about 6 wt % total of Al and Ti, the article portion including an outer surface on which is deposited a high temperature environmental resistant coating, in which method the environmental resistant coating is removed from the outer surface of the article portion and the article portion is recoated, the step after the coating is removed and before the article portion is recoated, of:

exposing at least the article portion to a reducing mixture of gases including, by weight, greater than 6% up to about 20% hydrohalogen gas, with the balance principally hydrogen gas, at a temperature in the range of about 1600°–2000° F. for a time greater than about 2 hours, sufficient to remove from beneath the outer surface of the article portion to a depth of about 0.005" at least one material selected from the group consisting of metal sulfides, Al, and Ti, and to avoid excessive intergranular attack and alloy depletion.

2. The method of claim 1 in which:

the article includes a microstructure selected from the group consisting of substantially a single crystal and directionally oriented multiple elongated grains;

the environmental resistant coating includes Al;

the hydrohalogen gas is hydrogen fluoride in the range of about 10–15 wt %; and, the time of exposure is in the range of about 2–10 hours.

3. In a method for weld repairing an article portion of a gas turbine article which has experienced high temperature operation in an engine, the article being made of a Ni base superalloy including Cr and at least about 6 weight % total of Al and Ti, the article portion including an outer surface on which is deposited a high temperature environmental resistant coating, the steps of:

removing the coating from the outer surface of the article portion;

exposing at least the article portion to a reducing mixture of gases including, by weight, greater than 6% up to about 20% hydrohalogen gas, with the balance principally hydrogen gas, at a temperature in the range of about 1600°–2000° F. for a time, greater than about 2 hours, sufficient to substantially reduce Al and Ti content from within the article portion beneath the outer surface to a depth of about 0.003" to provide a Cr-rich Ni layer in the article portion, to prepare the article portion for welding;

weld repairing the article portion at room temperature without preheating the article portion; and, recoating the article portion.

4. The method of claim 3 in which:

the article includes a microstructure selected from the group consisting of substantially a single crystal and directionally oriented multiple elongated grains;

the environmental resistant coating includes Al;

the hydrohalogen gas is hydrogen fluoride in the range of about 10–15 wt. %; and, the time of exposure is in the range of about 2–10 hours.

5. The method of claim 4 in which the article portion is a relatively thin outer wall having a thickness in the range of about 0.02–0.08".

6. The method of claim 4 in which the article portion is a projection of the article.

7. In a method for repairing an article portion of a gas turbine engine article which has experienced high temperature operation in an engine, the article being made of a Ni base superalloy including Cr and at least about 6 wt % total of Al and Ti, the article portion including an outer surface on which is deposited a high temperature environmental resistant coating, in which method the environmental resistant coating is removed from the entire outer surface of the article and the article portion is recoated, the step after the coating is removed and before the article portion is recoated of:

removing sulfides from beneath the outer surface by exposing the outer surface to a reducing mixture of gases including, by weight, greater than 6% up to about 20% hydrohalogen gas, with the balance principally hydrogen gas, at a temperature in the range of about 1600°–2000° F. for a time, greater than about 2 hours up to about 10 hours, sufficient to remove from beneath the outer surface of the article metal sulfides to a depth of about 0.005" and to avoid excessive intergranular attack and alloy depletion.

* * * * *